United States Patent [19]
Cherry et al.

[11] 3,858,630
[45] Jan. 7, 1975

[54] ROUTER

[75] Inventors: Loren D. Cherry, Glendale; Ronald L. Congrove; David E. Ohlson, both of Phoenix, all of Ariz.

[73] Assignee: Royal Industries, Inc., Pasadena, Calif.

[22] Filed: Apr. 13, 1973

[21] Appl. No.: 350,890

[52] U.S. Cl. .................................. 144/144, 90/13.2
[51] Int. Cl. ......................... B27c 5/02, B23q 35/04
[58] Field of Search ........ 144/144 R, 134 B, 134 R, 144/134 D; 269/21; 90/13.2, 13.7, 13.1

[56] References Cited
UNITED STATES PATENTS

| | | | |
|---|---|---|---|
| 877,894 | 1/1908 | Kelley | 144/134 D |
| 1,647,969 | 11/1927 | Long | 144/144 R |
| 3,211,061 | 10/1965 | Cretsinger | 144/144 R X |
| 3,233,887 | 2/1966 | Dunham | 269/21 |
| 3,495,636 | 2/1970 | Smith | 144/144 R |
| 3,543,636 | 12/1970 | Tracy | 144/144 R X |

Primary Examiner—Donald R. Schran
Attorney, Agent, or Firm—Christie, Parker & Hale

[57] ABSTRACT

A woodworking machine tool such as a router is provided with a supporting table for mounting the woodworking machine tool and workpiece supporting bed for mounting and holding a workpiece. The supporting table may include a template supporting bed to support a template having a preselected workpiece configuration cut therein. The supporting table includes a supporting structure for movably mounting the machine and movably supporting a profile element movable over the template to cause the machine to cut a workpiece in accordance with the configuration described by the template profile. The two supporting beds are integrally connected to allow the duplication of workpieces. The table is provided with workpiece clamps including vacuum operated holding plates. The machine tool is also adapted to control the path of the machine over preselected paths for effecting dadoing operations.

8 Claims, 5 Drawing Figures

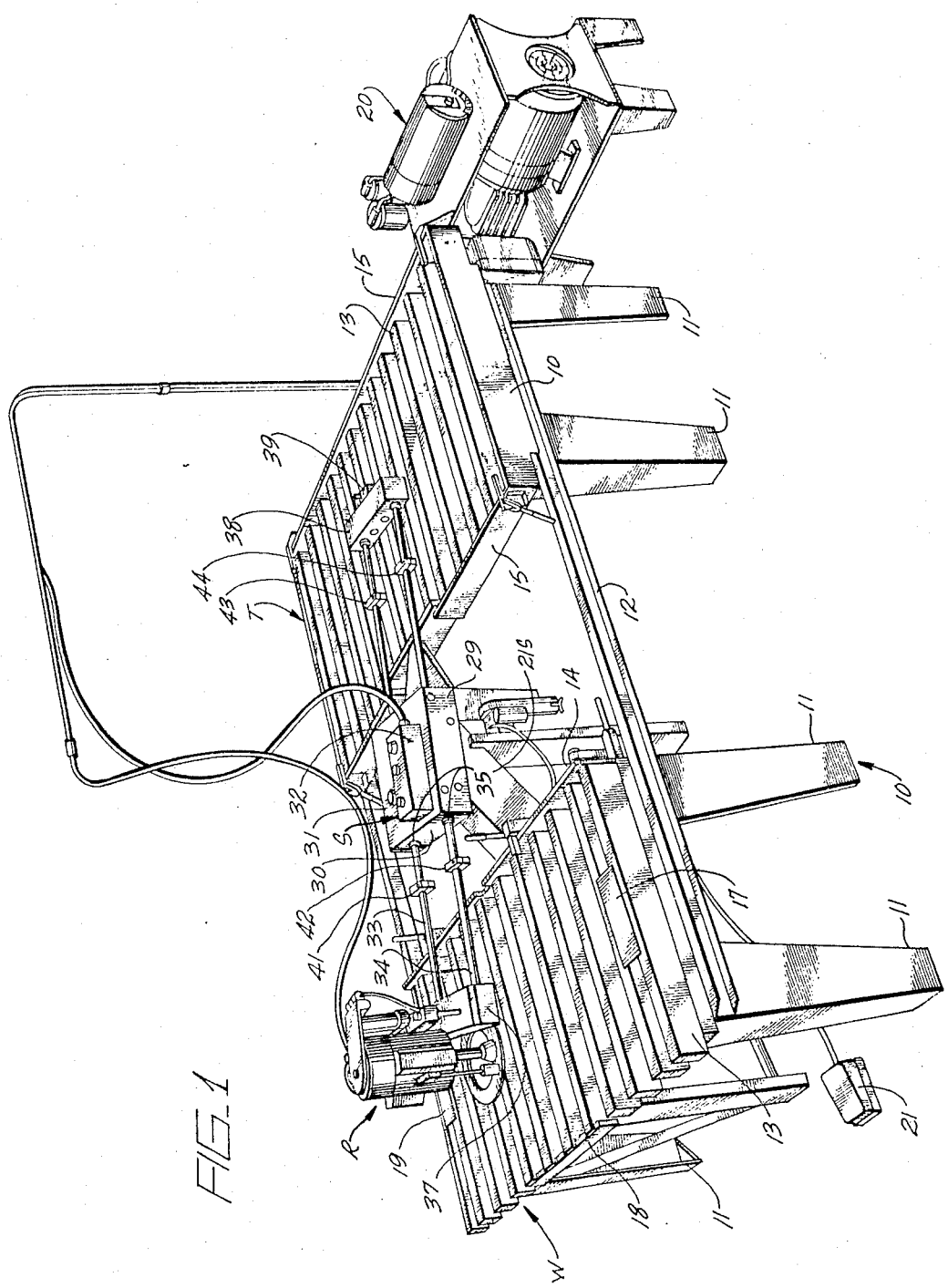

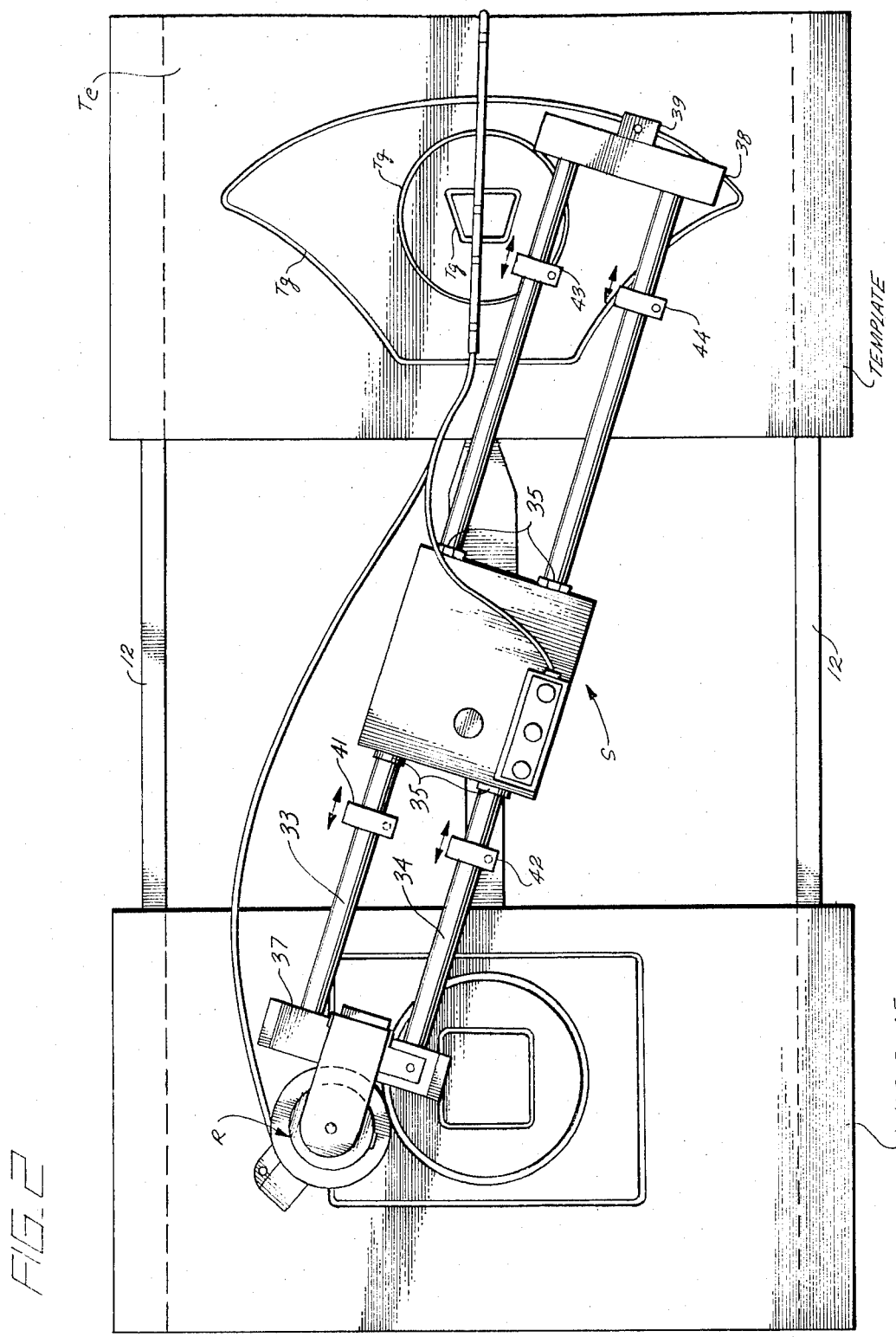

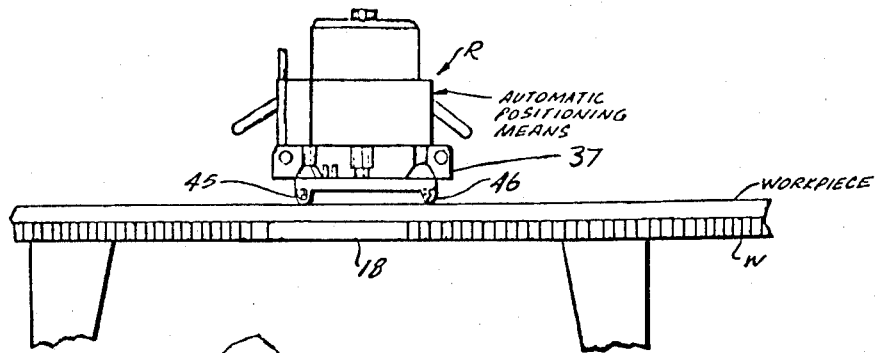
FIG_3
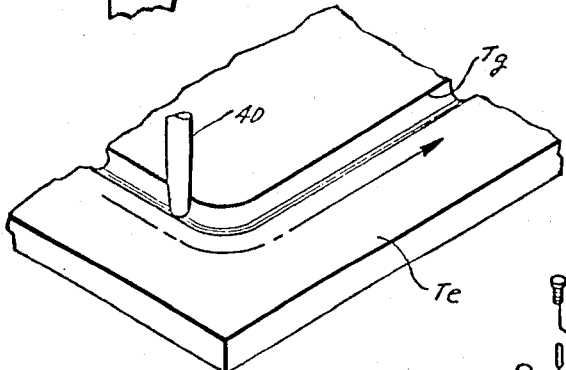
FIG_4
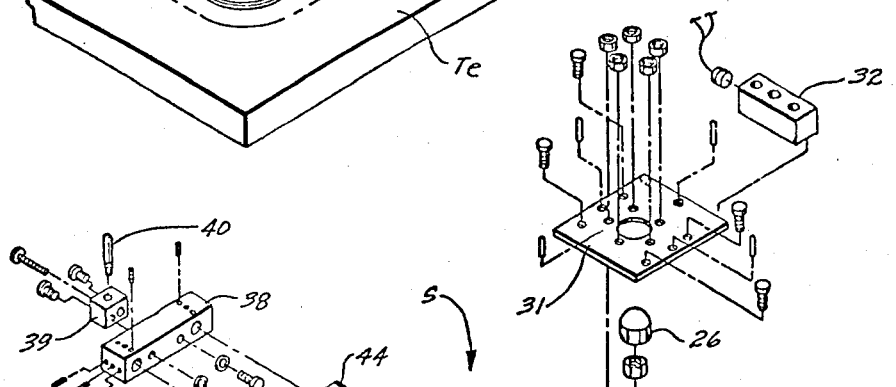
FIG_5
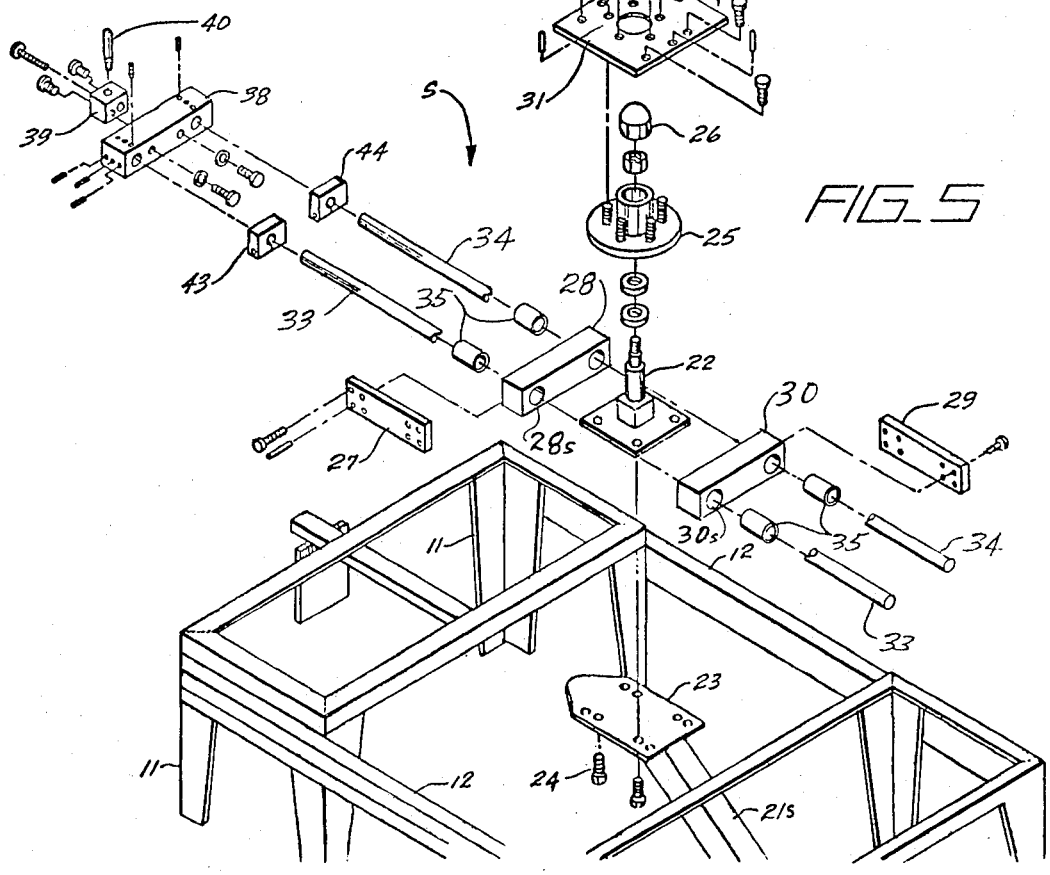

ROUTER

CROSS REFERENCE TO RELATED APPLICATION

This application is related to our earlier filed application bearing Ser. No. 176,026 and assigned to the same assignee as the present inventor which application is now abandoned.

DESCRIPTION OF THE PRIOR ART AND THE PRESENT INVENTION

This invention relates to a woodworking machine tool and in particular a woodworking machine tool such as a router having a pano-graph table integrated therewith.

Various types of machine tools are available and are now being employed in the woodworking trades. Most of these machine tools require an operator to have certain well-developed skills and experience in economically producing workpieces to required tolerances. In the metal working trade, as distinguished from the woodworking trade, various automatic controls have been developed and are in use to allow precision parts to be produced at high production rates by relatively unskilled operators. These metalworking machine tool controls generally are quite expensive and are not commercially feasible for use with the common woodworking machine tools.

At the present time some woodworking operations in the cabinet making trade and other woodworking mills require a large number of the same configured pieces to be produced with high precision. Certain of these operations have been automated to a certain extent without resorting to any expensive controls on machines adapted for such purposes. For example, certain woodworking operations have been developed to eliminate to a certain extent the high skills required by the machine operators by making a workpiece that has been precisely produced and then used as a template for producing similar pieces therefrom. In these operations the template is merely copied by placing it over the workpiece to be produced, cutting or shaping it to the same configuration. Each time, then, that a piece is to be manufactured the original piece is placed over the new workpiece and the new workpiece is copied, based on the template. Any errors in the production of the original workpiece will be produced in the copied pieces.

At the present there is a need for automatizing certain woodworking operations with relatively simple and relatively inexpensive woodworking machine tools. For example, in the cabinet making industry and in woodworking mills there is a need for automatic machinery for precisely and quickly cutting out sink tops during the manufacture of sink cabinets or for cutting out window lights in the manufacturing of doors, etc.

The present invention provides an improved, simple and economical woodworking machine tool adapted to allow a multiplicity of similar pieces to be produced through the use of a template having the profile of the final workpiece thereon to allow it to be employed to control the path of the woodworking machine tool by being coupled to the template. The machine tool itself can be readily employed by the machine operator for producing the template for defining the workpiece profile for subsequent use of the profiling element in repetitive multi-piece production on the same machine tool.

One such profile element for producing a large number of workpieces may be produced therefrom in a relatively inexpensive and simple manner obviating to a large extent the high skill required of such machine operators for producing subsequent workpieces. In such an application, the woodworking machine tool may be a router that is advantageously supported to allow it to be manipulated over the workpiece with a minimum effort and skill. The machine can be further advantageously controlled to allow it to produce a dadoing operation. For such operations, the woodworking machine includes simple and easy to use clamping means for holding the workpiece on the workpiece beds including odd configured pieces, such as L-shaped counter tops, in their correct relationship with the woodworking machine tool.

From a structural standpoint the present invention comprehends a woodworking machine tool for cutting wood, and similar materials having a frame for supporting a pair of spaced-apart workpiece supporting beds that are integrally connected. A woodworking machine tool support is provided for supporting the woodworking machine tool to allow it to readily be moved into working relationship with a workpiece mounted on one of the supporting beds and rotatable into working relationship with the other supporting bed. The supporting means for the machine tool further mounts a profile element to be movable in unison with the machine tool and overlying one of the workpiece beds for traveling in a preselected path described by the template and thereby controlling the path of the woodworking tool. The supporting means for the machine tool includes movable clamping means for defining the travel of the tool in preselected restricted paths. The machine includes clamping means for clamping a workpiece to each of the supporting beds. The machine further carries means for automatically moving the machine tool into and out of working relationship with a workpiece mounted on a supporting bed with a minimum of effort on the part of the machine operator.

These and other features of the present invention may be more fully appreciated when considered in the light of the following specification and drawings, in which:

FIG. 1 is a perspective view of the automatic woodworking machine tool embodying the present invention;

FIG. 2 is a top plan view of the machine of FIG. 1;

FIG. 3 is a fragmentary, front perspective view of the woodworking machine tool illustrating its relationship to a workpiece mounted on a work bed as viewed in FIG. 1;

FIG. 4 is a fragmentary top plan view of the machine profiling element illustrating its travel on a template; and FIG. 5 is an exploded view of a woodworking machine tool-profiling element support structure for the machine illustrated in FIG. 1.

Now referring to the drawings, a detailed description of the woodworking machine tool embodying the present invention will be discussed. It should be understood at the outset that the invention is applicable to various types of commercially available woodworking machines and in order to facilitate the understanding of the invention it will be described as applied to a commercially available routing machine for gouging and cutting out workpieces constructed of wood or similar material presently employed in the woodworking trade. The detailed construction of the router is of commercially available construction and it will be understood that the woodworking machine tool per se forms no part of the present invention. The router is identified in the drawing by the reference letter "R."

The woodworking machine tool of the present invention, then, is defined by a frame 10 constructed and defined for providing two work supporting beds or tables that are integrally connected. One of the tables is identified in FIG. 1 as the table W or the surface over which the router R is located, as illustrated. The table that normally supports the template or profile element is identified as the Table T. Each of the tables W and T are supported at a convenient working elevation above the floor by four legs 11 for each of the tables W and T. The two tables W and T then are connected together by means of longitudinally extending cross members 12 arranged on opposite sides of the tables, as illustrated. The work supporting surfaces are defined by a plurality of spaced-apart supporting members 13 extending the complete width of the tables between the four supporting legs 11 for the work table W, as illustrated in FIG. 1. The two tables W and T are constructed and defined in the same general fashion. Each of the tables W and T include clamping means such as the mechanically operated clamps 14, 15 and 16 arranged on the outer ends of the two tables for clamping a workpiece or a template to the tables to maintain them in a desired location. The supporting table W is also provided with vacuum holding plates identified as the plates 17, 18 and 19. The plates 17 and 19 are arranged adjacent the opposite lateral edges of the table W, while the plate 18 is arranged along the front edge of the table intermediate its ends for holding the workpiece through the application of a vacuum source thereto. The holding plate 18 is provided for correctly positioning a workpiece such as a cabinet top which may have a bend therein to assure the correct alignment of the workpiece with a template mounted on the table T. The vacuum holding plates 17, 18 and 19 are connected to a vacuum pump 20 which is the source for actuating the vacuum holding plates for holding the workpiece in position on the table W. The machine operator may readily actuate the vacuum holding plates 17–19 through the provision of a foot pedal 21 illustrated mounted on the supporting surface for the frame 10 so that the operator may manipulate the workpiece on the table W while controlling the application of the vacuum source or the vacuum pump 20.

The woodworking machine tool, or the router R, is movably supported by means of the supporting structure identified by the reference letter S. The supporting structure is mounted intermediate the tables W and T to not only support the router R and allow it to be moved over the work beds W and T but also supports a profile element movable over a workpiece supported on table T. The relationship of the workpiece and the template may be interchanged with respect to their illustrated relationships on the work tables W and T as is the case when the template is to be constructed by means of the machine tool of the present invention. The details of the supporting structure S may best be appreciated from examining FIG. 5. The frame 10 is constructed with an opening intermediate the inboard edges of the two tables W and T with arm 21S extending from the table W for mounting and supporting the machine tool supporting structure S. This supporting structure comprises a spindle assembly 22 which is secured to the supporting plate 23 mounted to the outer end of the supporting arm 21S, as best appreciated from examining FIG. 5. The spindle assembly 22 may be mounted to the plate 23 by means of conventional fasteners 24, as illustrated. The spindle assembly 22 mounts a hub 25 having a hubcap 26 mounted therewith. The sides of the spindle assembly 22 are enclosed through the provision of four side plates 27, 28, 29 and 30. The top of the spindle assembly 22 is then enclosed through the provision of the top cover plate 31 secured thereto and in turn mounting the electrical control box 32.

The front and rear plates 28 and 30 each are provided with sockets similar to the socket 30S for receiving longitudinally extending supporting arms 33 and 34 received in bushings 35 secured at the plate 30 for supporting the Router R and the extension of the supporting arms 33 and 34 are mounted to the rear plate 28 for supporting the profile element 40. The forward end of the mounting arms 33 and 34 are bridged by a machine tool holder or supporting member 37. The holder 37 is illustrated in FIG. 1 as mounting and securing the router R to the arms 33 to 34 so as to be movable with the movement of arms 33 and 34 linearly and rotatably about the spindle assembly 22. In the same fashion, the end plate 38 is secured to the opposite free ends of arms 33 and 34. The outboard end of the end plate 38 mounts a profile holding element 39. The profile element 40 depends from the holding member 39 to extend into a profile groove $Tg$ for the template $Te$ and is constrained to move in the path defined by the groove $Tg$.

From the above description of the supporting structure S, it should be evident that the machine tool R is mounted to the arms 33 and 34 to allow the machine operator to move the machine R linearly and rotatably over a workpiece by exerting force on the machine R. The machine R will move in and out on the arms 33 and 34 with the linear movement of the arms to assume a desired position and in the same fashion may be rotated about the spindle assembly 22 with the rotary movement of the arms 33 and 34 should also be recognized that the machine R may be utilized independently of the profiling element and structure to advantageously employ the supporting structure S. To this end, it is important to note that the supporting arms 33 and 34 may mount movable clamps 41 and 42 respectively mounted on the arms 33 and 34 on the side of the structure S mounting the router R, and clamps 43 and 44 respectively mounted on the arms 33 and 34 on the opposite side of the structure S for the router R. The clamps 41, 42, 43 and 44 are longitudinally movable along the arms and securable at preselected locations for functioning as stops that constrain the movement of the machine R along the arms 33 and 34 to thereby limit the travel of the router R. By these means, the position of the router R may be fixed with respect to the table W or the workpiece thereon to allow a groove to be cut into a workpiece of a preselected length. Alternatively, the router R may be mounted in a preselected position so as not to be movable through the positioning of the clamps 41–44 to allow the workpiece to be fed through the machine from one side of the work table W or the right side as illustrated in FIG. 1 to the opposite side to effect a dadoing or similar cutting operation.

The use of the router R for the dadoing operation can be further appreciated from examining FIG. 3. The router R is of conventional construction and therefore includes automatic positioning means for lowering the router into and out of working relationship with a workpiece mounted on the table W. The automatic positioning means is a feature of the commercially available routing machines. The routing machine R in accordance with the present invention is provided with a pair of casters 45 and 46 mounted on opposite sides of the routing machine and preferably behind the routing tool for effecting the dadoing operations. The casters 45 and 46 support the routing machine R in a preselected horizontal plane above a workpiece so that when a dadoing operation is to be performed the depth of the cut would be the same throughout the travel of the router R and its tool. These casters 45 and 46 compensate for any deflection of the arms 33 and 34 towards the outer travel of the machine R adjacent the forward edge of the table W due to the weight of the machine thereby providing a cut of the same depth throughout the desired length of the cut. The location of the casters 45 and 46 behind the routing tool allows a cut of even depth to occur throughout the workpiece as the router will leave the outer edge or a forward edge of the workpiece before the casters engage said edge.

From the above description, the operation of the woodcutting machine tool of the present invention should be fairly evident. In employing such a machine of the present invention it may be desirable to utilize the machine for first defining the template Te for use in manufacturing the piece having the desired configuration or cutouts recorded on the template T. For this purpose, a template material will be mounted on the table W and secured in place by means of the clamps 14, 17, 18 and 19. For example, with this template material on the table W, the desired configuration in the form of a groove or track Tg will be routed out on the template Te to define the various desired configurations. In FIG. 2, for example, the template Te is illustrated mounted over the table T and having grooves Tg of various configurations gouged therein. The outer fan-shaped configuration Tg is the profile for producing the rectangular cutout of corresponding size, as defined on the workpiece and illustrated in FIG. 2. The inner substantially diamond shaped groove Tg on the template Te is the profile for the smaller inner rectangular illustrated on the workpiece. The substantially circular profile Tg is for producing the circular cutout on the workpiece. The difference in configuration between the template and workpiece is due to the relative geometry of the profile element and router as illustrated in FIG. 2. The profile element 40, then, will be constrained to move in the track defined by a selected groove Tg and when the profile element is arranged in this fashion constrains the movement of the opposite end of the supporting structure S causing the router R to follow the path defined by a groove Tg and cause the desired routing configuration to be performed on the workpiece, such as illustrated in FIG. 2. As is evident, once the template Te is prepared by means of the routing machine R, it will be transferred, supported and clamped on the Table T. This allows the workpiece to be mounted on the table W under the routing machine R. The operator may then advantageously lower the routing machine R and move it to follow the track Tg and cut out the workpiece in accordance with a track Tg which the profile element 40 is tracing. This allows the workpiece to be precisely cut or routed in accordance with the template Te provided therefor. With the completion of one workpiece a similar workpiece may be produced by substituting the new workpiece for the completed workpiece on the table W and the same operations will take place. This operation will be repeated as many times as required. This allows the operator to cut out workpieces at a high production rate in a simple and economical fashion not heretofore thought possible.

What is claimed is:

1. A woodworking machine tool comprising a frame for supporting a pair of spaced apart workpiece supporting beds, a woodworking machine tool supporting member having a pair of arms extending in opposite directions from the member for overlying each of the supporting beds, and a woodworking machine tool mounted on one of said arms to be movable along with the arms and rotatable relative to the tool supporting member for positioning the tool in cutting relationship with a workpiece mounted on one of the supporting beds, the arm extending in the opposite direction from said one arm carrying a profile following element for controlling the path through which the woodworking machine tool is moved to allow the tool to be moved through a preselected profile for cutting a workpiece to a shape corresponding to the path defined by the profile following element when the profile following element is constrained to follow a path defined by a template mounted on the other supporting bed.

2. A woodworking machine tool as defined in claim 1 including clamping means mounted on at least one of the workpiece supporting beds for clamping a workpiece thereon.

3. A woodworking machine tool as defined in claim 2 wherein the clamping means comprises vacuum holding means operable by the machine operator for clamping and unclamping a workpiece to the bed.

4. A woodworking machine tool as defined in claim 1 wherein the machine tool is a router.

5. A woodworking machine tool as defined in claim 4 wherein the router includes means for automatically moving the router into and out of a cutting relationship with a workpiece.

6. A woodworking machine tool as defined in claim 1 including clamps movably mounted on the pair of arms for positioning them in a preselected location for controlling the path of movement of the machine tool along with the arms for defining a cut of a preselected length.

7. A woodworking machine tool as defined in claim 1 including means for clamping the machine tool in a preselected position relative to the workpiece supporting bed.

8. A woodworking machine tool as defined in claim 1 wherein the machine tool includes a pair of supporting elements movable into and out of engagement with a workpiece on the workpiece supporting bed and slidable along the workpiece to allow a cut to be uniformly made throughout the movement of the cutting tool.

\* \* \* \* \*